US00RE47559E

(19) United States
(12) Reissued Patent
Ryu et al.

(10) Patent Number: US RE47,559 E
(45) Date of Reissued Patent: Aug. 6, 2019

(54) PARKING AREA DETECTING APPARATUS AND METHOD THEREOF

(71) Applicants: HYUNDAI MOTOR COMPANY, Seoul (KR); KIA MOTORS CORPORATION, Seoul (KR)

(72) Inventors: Seong Sook Ryu, Seoul (KR); Eu Gene Chang, Gunpo-si (KR); Jae Seob Choi, Hwaseong-si (KR); Dae Joong Yoon, Hwaseong-si (KR); Jae Kyu Suhr, Incheon (KR); Ho Gi Jung, Seoul (KR)

(73) Assignees: Hyundai Motor Company, Seoul (KR); Kia Motors Corporation, Seoul (KR); Industry-University Cooperation Foundation Hanyang Universtiy, Seoul (KR)

(21) Appl. No.: 15/395,158

(22) Filed: Dec. 30, 2016

Related U.S. Patent Documents

Reissue of:
(64) Patent No.: 9,361,529
Issued: Jun. 7, 2016
Appl. No.: 14/315,178
Filed: Jun. 25, 2014

(30) Foreign Application Priority Data

Nov. 14, 2013 (KR) ..... 10-2013-0138519

(51) Int. Cl.
*G06K 9/00* (2006.01)
*G08G 1/16* (2006.01)

(52) U.S. Cl.
CPC ..... *G06K 9/00812* (2013.01); *G08G 1/168* (2013.01)

(58) Field of Classification Search
CPC ..... G06K 9/00812; G08G 1/168
See application file for complete search history.

(56) References Cited

U.S. PATENT DOCUMENTS 5,980,664 A * 11/1999 Wilson, Sr. ..... E01C 23/246 156/71
5,999,092 A * 12/1999 Smith et al. ..... G01S 13/931 340/436
6,704,653 B2 * 3/2004 Kuriya ..... B62D 15/0275 340/425.5
7,659,835 B2 * 2/2010 Jung ..... B62D 15/0285 340/932.2
7,930,078 B2 * 4/2011 Sugiura ..... B60R 1/00 340/435

(Continued)

FOREIGN PATENT DOCUMENTS

KR 10-2011-0002688 A 1/2011
KR 10-1007149 B1 1/2011

(Continued)

*Primary Examiner* — Jeffrey D Carlson
(74) *Attorney, Agent, or Firm* — Morgan, Lewis & Bockius LLP

(57) ABSTRACT

A parking area detecting method includes generating a top view image by capturing images of surroundings of a vehicle, detecting a first directional parking line from the top view image, detecting a second directional parking line having a direction different from a direction of the first directional parking line from the top view image, and detecting a parking area by combining the first directional parking line and the second directional parking line.

15 Claims, 12 Drawing Sheets

(a)

(b)

(56) References Cited

U.S. PATENT DOCUMENTS

| | | | | |
|---|---|---|---|---|
| 2007/0273554 | A1* | 11/2007 | Sakakibara | B62D 15/0275 340/932.2 |
| 2008/0140286 | A1* | 6/2008 | Jung | B62D 15/0285 701/41 |
| 2011/0116717 | A1 | 5/2011 | Lee | |
| 2011/0216194 | A1* | 9/2011 | Kosaki | H04N 7/18 348/148 |
| 2013/0058525 | A1 | 3/2013 | Sugio | |
| 2013/0162825 | A1 | 6/2013 | Yoon et al. | |
| 2014/0160287 | A1* | 6/2014 | Chen | G08G 1/168 348/148 |

FOREIGN PATENT DOCUMENTS

| | | | | |
|---|---|---|---|---|
| KR | 20110002688 | | * | 1/2011 |
| KR | 20110002688 | A | | 1/2011 |
| KR | 20120086576 | A | * | 8/2012 |
| KR | 2013-0025346 | A | | 3/2013 |
| KR | 10-1283792 | B1 | | 7/2013 |
| KR | 2013-0072709 | A | | 7/2013 |
| KR | 2013-0073256 | A | | 7/2013 |

* cited by examiner

PARKING AREA DETECTING APPARATUS AND METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application is based on and claims priority from Korean Patent Application No. 10-2013-0138519, filed on Nov. 14, 2013 in the Korean Intellectual Property Office, the entire contents of which are hereby incorporated by reference.]

*This application is a reissue application of U.S. Pat. No. 9,361,529 issued on Jun. 7, 2016 issued from U.S. patent application Ser. No. 14/315,178 filed on Jun. 25, 2014, which is based on and claims priority from Korean Patent Application No. 10-2013-0138519, filed on Nov. 14, 2013, in the Korean Intellectual Property Office, the entire contents of each are hereby incorporated by reference.*

TECHNICAL FIELD

The present inventive concept relates to a parking area detecting apparatus and a method thereof, and more particularly, to a parking area detecting apparatus capable of detecting a parking area near a vehicle and providing corresponding information to a driver, and a method thereof.

BACKGROUND

In general, a driver in a vehicle is mostly visible at a front side. Thus, a driver visible at the left, right, and rear sides is mostly covered by a vehicle body, so the driver may have considerably limited visibility. In order to solve this problem, in general, a visibility assisting unit (e.g., a side mirror, and the like) is used to complement the driver's limited visibility. A current tendency is that techniques including a camera unit that captures images of an exterior of a vehicle and provides the same to drivers are applied to vehicles.

An around view monitoring (AVM) system, among these techniques, includes a plurality of cameras installed surrounding a vehicle to provide 360-degree omnidirectional images. The AVM system combines images around a vehicle captured by a plurality of cameras that serve to capture images of a surrounding area of the vehicle, to provide a top view image as if a driver views his or her vehicle from the sky, thus displaying an obstacle and a parking area near the vehicle and resolving a blind spot.

However, when the AVM system detects a parking area, if a parking area is covered, in a top view image, with an obstacle such as a column, or the like, the AVM system may not be able to detect the parking area the moment when a vehicle starts to park.

SUMMARY

Accordingly, the present inventive concept has been made to solve the above-mentioned problems occurring in the prior art while advantages achieved by the prior art are maintained intact.

One object to be achieved by the present inventive concept is to provide a parking area detecting apparatus capable of a detecting a parking area even though the parking area is covered with an obstacle such as a column, or the like, and a method thereof.

One aspect of the present inventive concept relates to a parking area detecting method including generating a top view image by capturing images of surroundings of a vehicle; detecting a first directional parking line from the top view image; detecting a second directional parking line having a direction different from a direction of the first directional parking line from the top view image; and detecting a parking area by combining the first directional parking line and the second directional parking line.

The detecting of the first directional parking line may include: detecting edge pixels included in the top view image; detecting two parallel linear lines from the top view image by using the detected edge pixels; and setting an area between the two parallel linear lines as an area of the first directional parking line.

In the detecting of the edge pixels, edge pixels having a particular direction, among edge pixels included in the top view image, may be detected.

In the detecting of the edge pixels, edge pixels existing within a pre-set distance from the vehicle, among the edge pixels, may be detected.

The detecting of the second directional parking line may include: detecting edge pixels at a pre-set angle with respect to the first directional parking line among the edge pixels included in the top view image; measuring differences between a linear template and the edge pixels by positions of the first directional parking line by using the linear template; and determining positions of local minimum points of the differences, as positions of the second directional parking line.

In the detecting of the edge pixels, edge pixels having pixel values decreased in the first direction and edge pixels having pixel values increased in the first direction may be detected, respectively.

The method may further include: calculating reliability of a parking area on the basis of a difference of the second directional parking line constituting the parking area; calculating occupancy of an interior of the parking area by using position information of an object around the vehicle obtained by an ultrasonic sensor; and determining a parking area on the basis of the reliability and occupancy.

The method may further include: when a parking area previously detected exists, predicting a current location according to a movement of the vehicle with respect to the previously detected parking area; comparing the parking area with the previously detected parking area and determining a proportion of an overlapping area therebetween; and when the overlapping area is equal to or less than a pre-set proportion, registering the parking available area as a new parking area, and when the overlapping area exceeds the pre-set proportion, selecting one of the parking available area and the previously detected parking area.

The method may further include: generating a template in at least one of detected parking areas and a tracked parking area.

The method may further include: when a parking area is not detected from within the top view image, predicting a current location according to a movement of the vehicle with respect to the previously detected parking area; and displaying the predicted parking area within the top view image.

BRIEF DESCRIPTION OF THE DRAWINGS

The above and other objects, features and advantages of the present inventive concept will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Hereinafter, exemplary embodiments of the present inventive concept will be described in detail with reference to the accompanying drawings.

Figure 1:
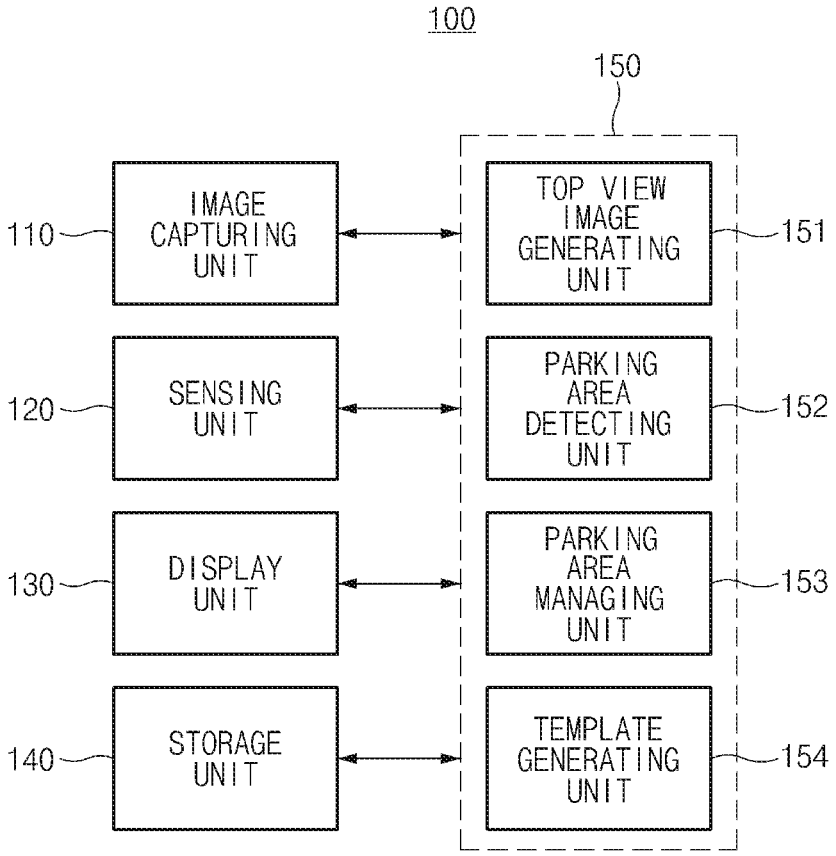
FIG. 1 is a block diagram illustrating a configuration of a parking area detecting apparatus according to an exemplary embodiment of the present inventive concept.

FIG. 1 is a block diagram illustrating a configuration of a parking area detecting apparatus according to an exemplary embodiment of the present inventive concept.

Referring to FIG. 1, a parking area detecting apparatus 100 may include an image capturing unit 110, a sensing unit 120, a display unit 130, a storage unit 140, and a controller 150.

The image capturing unit 110 may capture the surroundings of a vehicle. The image capturing unit 110 may be implemented as a plurality of cameras to capture images of the surroundings of the vehicle in 360-degree omnidirections. For example, the image capturing unit 110 may be implemented as four cameras installed at front, rear, left, and right sides of the vehicles. The image capturing unit 110 may be implemented as wide angle cameras for capturing images of the surroundings of a vehicle to reduce the number of cameras.

Images of the surroundings of the vehicle captured by the image capturing unit 110 may be processed by the controller 150 so as to be converted into a top view image as if the vehicle was viewed from above. The image capturing unit 110 may continuously capture images of the surroundings of the vehicle to continuously provide information regarding the surroundings of the vehicle to a driver.

The sensing unit 120 may sense information regarding a state of the vehicle. The sensing unit 120 may include a steering angle sensor and a wheel speed sensor capable of sensing a movement distance and a movement direction of the vehicle. Also, the sensing unit 120 may include an ultrasonic sensor capable of sensing a location of an object around the vehicle.

The display unit 130 may display a top view image. Also, the display unit 130 may display a parking area detected from within the top view image and a template set in the parking area. Meanwhile, the display unit 130 may be implemented as various display panels such as a liquid crystal display (LCD), an organic light emitting diode (OLED) display, a plasma display panel (PDP), or the like, and may be implemented as a transparent display panel, a flexible display panel, and the like.

The storage unit 140 stores information regarding the parking area detected by the controller 150. The storage unit 140 may store a list of packing areas included in the top view image. Thereafter, when a new parking area and a column are detected in the top view image according to a movement of the vehicle, the storage unit 140 may store information on the new parking area. Also, the storage unit 140 may store a form of a template to be set in the parking area to track the template and the parking area used to detect a second directional parking line.

The controller 150 may control a general operation of the parking area detecting apparatus 100. Also, the controller 150 may detect a parking area from a top view image through image processing, and manage a list of the detected parking area. Also, the controller 150 may set a template in the detected parking area to track the parking area. Also, when a parking area is not detected from within the top view image, the controller 150 may predict a parking area by using a parking area detected previously. Hereinafter, a detailed configuration of the controller 150 will be described.

A top view image generating unit 151 may generate a top view image by combining images around a vehicle captured by the image capturing unit 110.

A parking area detecting unit 152 may detect a parking area within the top view image generated by the top view image generating unit 151. The parking area detecting unit 152 may detect a parking area by detecting a parking line. In detail, the parking area detecting unit 152 may detect a first directional parking line within the top view image and detect a second directional parking line in a direction different from the first directional parking line. The parking area detecting unit 152 may detect a parking area by combining the first directional parking line and the second directional parking line.

In order to detect the first directional parking line, the parking area detecting unit 152 may detect edge pixels included in the top view image. Here, the parking area detecting unit 152 may detect edge pixels having a particular direction among the edge pixels included in the top view image. Also, the parking area detecting unit 152 may detect edge pixels existing within a pre-set distance from the vehicle among the edge pixels included within the top view image. By limiting the detected edge pixels, data throughput may be reduced in the video processing process and the video may be rapidly processed. Also, the parking area detecting unit 152 may detect two parallel linear lines by using the detected edge pixels. With the two detected parallel linear lines, the parking area detecting unit 152 may set a first directional parking line that has an area between the two parallel linear lines. That is, a distance between the two linear lines may correspond to a thickness of the first directional parking line.

In order to detect a second directional parking line, the parking area detecting unit 152 may detect edge pixels perpendicular with respect to the first directional parking line among the edge pixels included in the top view image. Also, the parking area detecting unit 152 may measure differences between the template and the edge pixels by positions of the first directional parking line by using a linear template. In this case, the parking area detecting unit 152 may measure the differences by detecting edge pixels having pixel values decreased in the first direction and edge pixels having pixel values increased in the first direction. According to the difference measurement results, the parking area detecting unit 152 may detect a second directional parking line by determining positions of local minimum points of the differences.

When the first and second directional parking lines are detected, the parking area detecting unit 152 may detect an area formed by the first and second directional parking lines as a parking area.

Meanwhile, in order to enhance reliability of the detected parking area, the parking area detecting unit 152 may determine a final parking area by calculating reliability and occupancy with respect to the detected parking area. In detail, the parking area detecting unit 152 may calculate reliability of the parking area on the basis of differences in the second directional parking line constituting the detected parking area, and calculate occupancy within the parking area by using location information of an object around the vehicle obtained by the ultrasonic sensor of the sensing unit 120. The parking area detecting unit 152 may determine the final parking area on the basis of the calculated reliability and occupancy. Accordingly, reliability of the parking area can be enhanced and whether the parking area is a parking area in which the vehicle parks in actuality can be determined.

A parking area managing unit 153 may register the detected parking area to a parking area list and manages and track it. Namely, the parking area detecting unit 152 may detect a parking area each time a top view image is generated, and the parking area managing unit 153 may compare respective parking areas detected from the top view image to register a new parking area or integrate overlapping parking areas in managing the parking areas.

When a parking area is detected by the parking area detecting unit 152, the parking area managing unit 153 may determine whether a parking area which was detected previously exists. When a parking area which was detected previously does not exist, the parking area managing unit 153 may determine the currently detected parking area as a new parking area and register it to the parking area list. When a parking area which was detected previously exists, the parking area managing unit 153 compares the currently detected parking area with the predicted previously detected parking area, and determine whether the currently detected parking area is a newly detected parking area or whether the currently detected parking area is identical to the previously detected parking area. In detail, the parking area managing unit 153 may predict a current location according to a movement of the vehicle with respect to the parking area which was detected previously. The parking area managing unit 153 may compare the currently detected parking area with the predicted previously detected parking area whose position is predicted, and may determine whether the currently detected parking area is a new parking area according to a proportion of an overlapping area.

Even when a parking area is not detected from within the current top view image due to an obstacle, or the like, the parking area managing unit 153 may predict a current location of the vehicle with respect to the parking area registered to the parking area list and display the predicted parking area in the top view image.

A template generating unit 154 may generate a template for at least one of the parking areas registered to the parking region list. The template generating unit 154 may continuously track a parking area by using the generated template.

Figure 2:
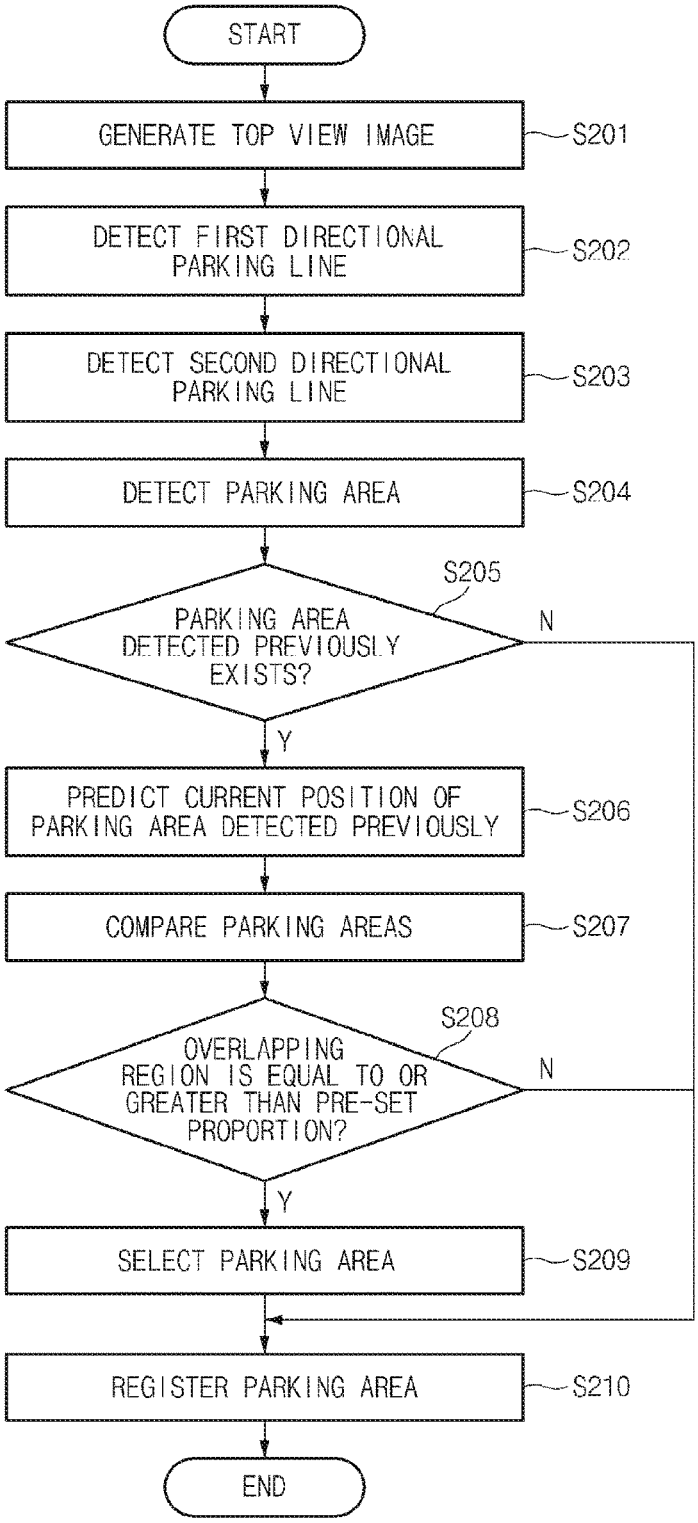
FIG. 2 is a flow chart illustrating a method for detecting a parking area according to an exemplary embodiment of the present inventive concept.

FIG. 2 is a flow chart illustrating a method for detecting a parking area according to an exemplary embodiment of the present inventive concept.

Referring to FIG. 2, first, the parking area detecting apparatus 100 may generate a top view image (S201). In detail, the parking area detecting apparatus 100 may capture images of the surroundings of a vehicle in 360-degree omnidirection and combine the captured images to generate a top view image.

When the top view image is generated, the parking area detecting apparatus 100 may detect a first directional parking line within the top view image (S202). The first direction refers to a direction indicated by a line that is formed by connecting entrance lines of respective parking areas when a plurality of parking areas each having the same shape are continuously arranged. Here, first, features of the first directional parking line will be described and then a process of detecting the first directional parking line will be described.

The first directional parking line may have a direction similar to a direction in which a vehicle moves in search for a parking space, in consideration of the characteristics of a parking area. The first directional parking line may exist within an interested area in terms of a general road width, a camera specification, and the like. The first directional parking line may be drawn in a bright color, relative to a bottom surface of the vehicle. Thus, the first directional parking line may be composed of a linear line whose color is changed from a dark color to a bright color and a linear line whose color is changed from a bright color to a dark color.

In order to detect the first directional parking line, first, edge pixels may be detected from within the top view image. This will be described with reference to FIG. 3.

Figure 3:
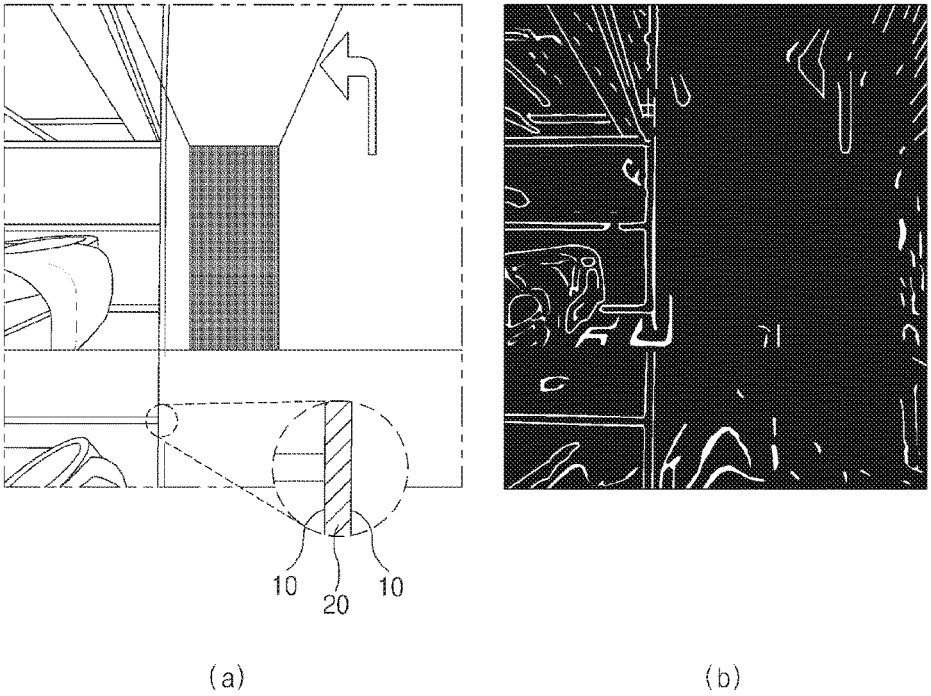
FIG. 3 is a view illustrating a process for detecting an edge pixel according to an exemplary embodiment of the present inventive concept.

FIG. 3 is a view illustrating a process for detecting an edge pixel according to an exemplary embodiment of the present inventive concept.

In FIG. 3, (a) shows a top view image generated by capturing images of surroundings of a vehicle. Referring to (a) of FIG. 3, it can be seen that a first directional parking line 20 exists on the left side of the vehicle. In FIG. 3, (b) shows results of detecting edge pixels within the top view image illustrated in (a) of FIG. 3. Referring to (b) of FIG. 3, various pixels having edges, as well as the first directional parking line 20, may all be detected from within the top view image. Thus, the parking area detecting apparatus 100 may detect edge pixels existing within a pre-set distance (e.g., 150 centimeters) from the vehicle in order to reduce video throughput and enhance a detection rate of the first directional parking line 20. Also, the parking area detecting apparatus 100 may detect edge pixels having a pre-set direction (e.g., a direction within ±45° or ±30° on the basis of a movement direction of the vehicle).

When the edge pixels are detected from within the top view image, the parking area detecting apparatus 100 may detect two parallel linear lines 10 by using the detected edge pixels. The two parallel linear lines 10 may be expressed by Equation 1 below.

$$x1=ay1+b$$

$$X2=ay2+c \quad \text{[Equation 1]}$$

Theoretically, in order to determine the two parallel linear lines 10, values of unknowns a, b, and c need to be determined, and when coordinates of three or more points existing in two parallel linear lines 10 are known, the values of unknowns a, b, and c may be determined. Thus, two parallel linear lines 10 may be detected by substituting coordinates of edge pixels to the Equation. In this case, when edge pixels not existing in the first directional parking line 20 are detected, two linear lines 10 that minimize a least square error may be detected. Also, in order to minimize an influence of edge pixels not existing in the first directional parking line 20, two parallel linear lines 10 may be detected by using a random sample consensus (RANSAC) algorithm.

Figure 4:
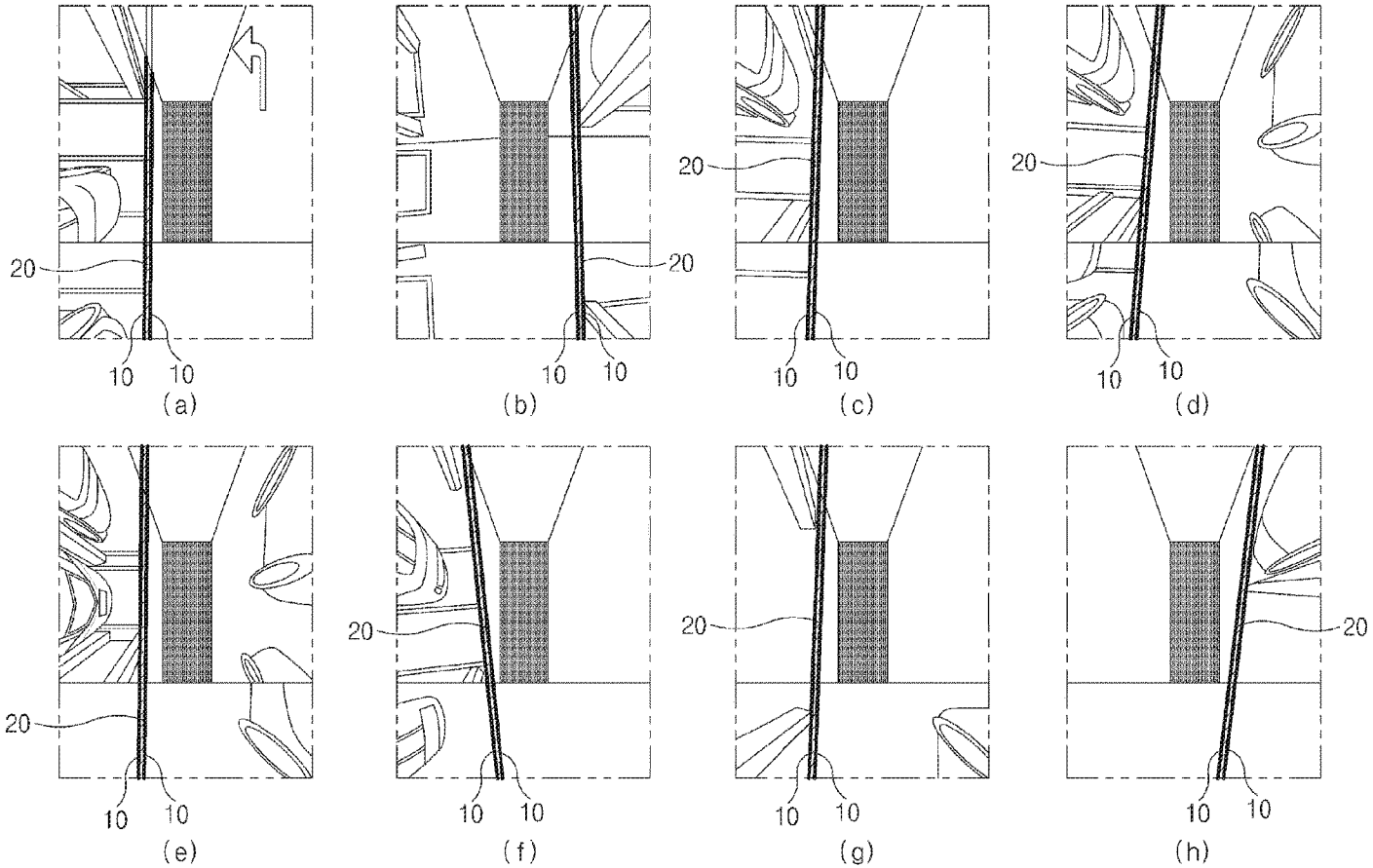
FIG. 4 is a view illustrating results of detecting a first directional parking line according to an exemplary embodiment of the present inventive concept.

FIG. 4 is a view illustrating results of detecting the first directional parking line according to an exemplary embodiment of the present inventive concept.

Referring to (a) through (h) of FIG. 4, it can be seen that the first directional parking line 20 may be accurately detected in various parking environments through the foregoing method. In particular, referring to (d) and (e) of FIG. 4, it can be seen that, even when the first directional parking line 20 is discontinuously formed, the first directional parking line 20 can be accurately detected. Also, referring to (g) and (h) of FIG. 4, although the top view image is dim (not clear) so a parking line is not easily discriminated, the first directional parking line 20 may be accurately detected.

When the two parallel linear lines 10 are detected, a first directional parking line 20 may be defined as a line having an area between the two linear lines 10. A distance between the two linear lines 10 may correspond to a thickness of the first directional parking line 20.

After the first directional parking line 20 is detected, a second directional parking line may be detected (S203). The second directional parking line refers to a parking line which is perpendicular with respect to the first directional parking line (in case of right angled parking or longitudinal parking) or a parking line at a predetermined angle (in case of slanted parking) with respect to the first directional parking line. The second directional parking line may also be drawn in a color brighter than that of the bottom surface, like the first directional parking line, and thus, the second directional parking line may be composed of a linear line whose color is changed from a dark color to a bright color and a linear line whose color is changed from a bright color to a dark color.

In order to detect the second directional parking line, edge pixels at a pre-set angle (e.g., ±90° in case of a right angled parking slot or a longitudinal parking slot) with respect to the first directional parking line are detected. As for the second directional parking line, a relative angle may be determined according to the first directional parking line and a shape of a parking slot, so particular edge pixels may be detected. Also, by using a linear template 30, differences between the template 30 and the edge pixels may be measured by positions of the first directional parking line. A position at which a difference is equal to or smaller than a pre-set value according to the difference measurement results may be determined as a position of the second directional parking line. The process of detecting the second directional parking line will be described in detail with reference to FIGS. 5 and 6.

Figure 5:
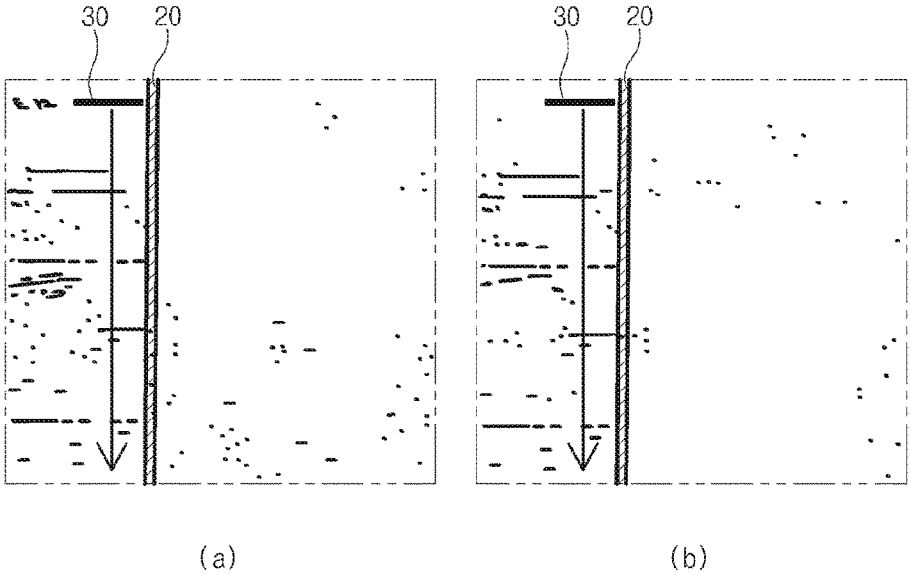
FIG. 5 is a view illustrating a process of measuring differences using a template according to an exemplary embodiment of the present inventive concept.

FIG. 5 is a view illustrating a process of measuring a difference using a template 30 according to an exemplary embodiment of the present inventive concept.

Referring to (a) and (b) of FIG. 5, edge pixels perpendicular with respect to the first directional parking line may be detected in the illustration of a right angled parking slot. Here, in detecting edge pixels to detect the second directional parking line, edge pixels whose pixel values are decreased in the first direction and edge pixels whose pixel values are increased in the first direction may be detected, respectively. In FIG. 5, (a) shows the results of detecting edge pixels changing from a dark color to a bright color in a downward direction of the top view image among edge pixels perpendicular with respect to the first directional parking line 20. In FIG. 5, (b) shows the results of detecting edge pixels changing from a bright color to a dark color in a downward direction of the top view image among edge pixels perpendicular with respect to the first directional parking line.

When edges pixels are detected, by using a linear template 30 as illustrated in (a) and (b) of FIG. 5, differences between the template 30 and the edge pixels are measured by positions of the first directional parking line 20, while moving the template 30 along the first directional parking line 20. The differences may be measured by using a matching algorithm such as a chamfer matching algorithm.

Figure 6:
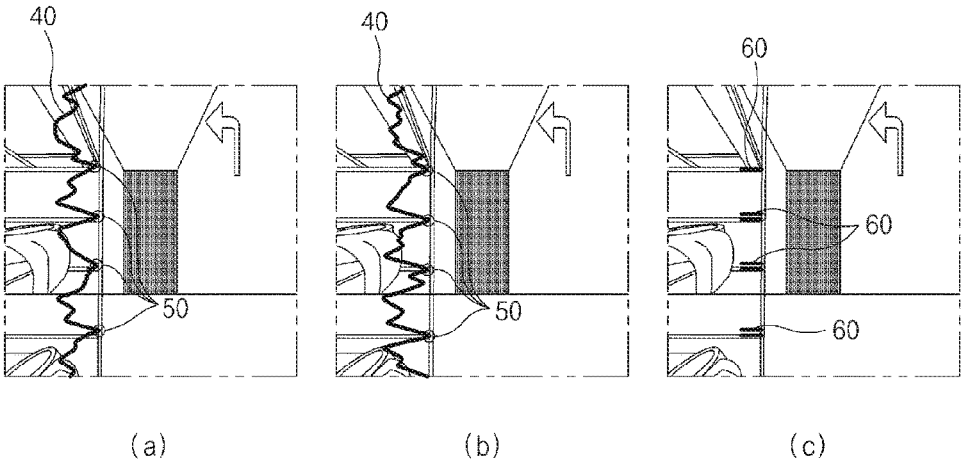
FIG. 6 is a view illustrating a process of detecting a second directional parking line according to an exemplary embodiment of the present inventive concept.

FIG. 6 is a view illustrating a process of detecting a second directional parking line according to an exemplary embodiment of the present inventive concept.

In FIG. 6, (a) and (b) show the results of measuring differences using a template in the images of (a) and (b) of FIG. 5. The graphs illustrated (a) and (b) of FIG. 6 show difference value between the template 30 and edge pixels by positions of the first directional parking line, and the difference values are reduced as they are closer to the first directional parking line. The thick line 40 indicates the difference value between the template and edge pixels.

The second directional parking line may be detected by determining positions of local minimum points 50 of the difference value according to the difference measurement results as positions of the second directional parking line. In FIG. 6, (c) shows the results of marking a linear line corresponding to the second directional parking line 60 by determining the positions detected as local minimum points 50 in (a) and (b) of FIG. 6, as the second directional parking line 60.

Meanwhile, in detecting the second directional parking line 60, only one of two linear lines constituting the second directional parking line 60 may be detected due to an obstacle such as a column, or the like, but the second directional parking line 60 may be recognized only with the single linear line. Referring to (c) of FIG. 6, in the three lower ones among the four second directional parking lines 60, two linear lines may be detected and recognized as second directional parking lines 60, like the first directional parking line 20. In the uppermost second directional parking line in the top view image, only one linear line changing from a bright color to a dark color, among two linear lines constituting the parking line, may be detected but it may be recognized as a second directional parking line 60. Namely, a multiple hypothesis scheme in which the second directional parking line 60 is detected only as a single linear line or as two linear lines may be used.

When the first directional parking line 20 and the second directional parking line 60 are detected, the first direction parking line 20 and the second directional parking line 60 may be combined to detect a parking area 70 (S204). This will be described with reference to FIG. 7.

Figure 7:
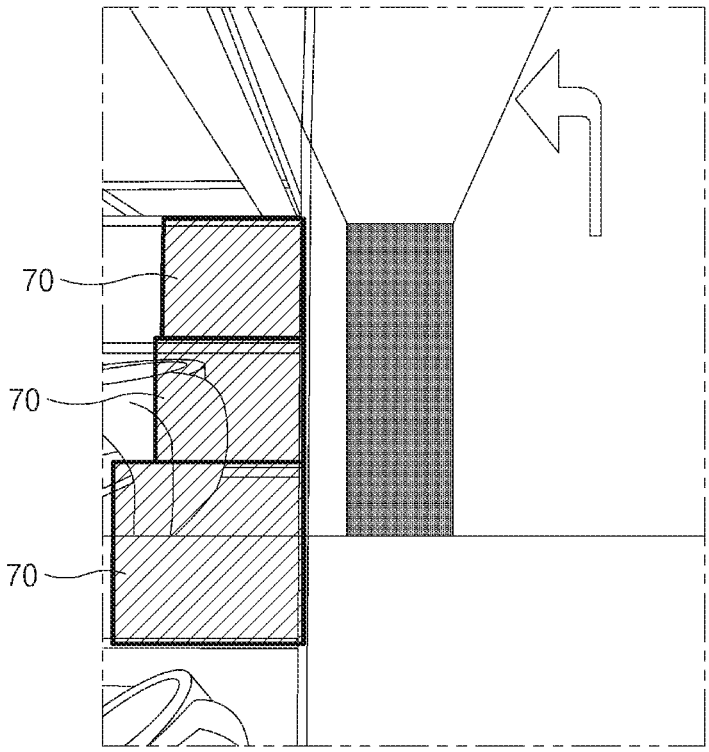
FIG. 7 is a view illustrating a process of detecting a parking area according to an exemplary embodiment of the present inventive concept.

FIG. 7 is a view illustrating a process of detecting a parking area according to an exemplary embodiment of the present inventive concept.

Referring to FIG. 7, square parking areas 70 detected by combining a first directional parking line and a second directional parking line are displayed. As described above, the second directional parking line may be detected as a single linear line or two linear lines. Thus, the second directional parking line of the parking area detected by combining the first directional parking line and the second directional parking line may be composed of two, three, or four linear lines. The uppermost parking area among the detected three parking areas 70 in FIG. 7 correspond to a parking area detected with three linear lines, and the other two parking areas correspond to parking areas detected with four linear lines.

Meanwhile, when parking areas 70 are detected from within the top view image, the parking area detecting apparatus 100 may determine a final parking area by calculating reliability and occupancy with respect to the detected parking areas in order to enhance reliability of the detected parking area. Namely, when the parking areas are detected from within the top view image, reliability of the parking areas may be calculated on the basis of differences of the second directional parking line. Occupancy of interiors of the parking areas may be calculated by using position information of an object around the vehicle obtained by the ultrasonic sensor. A parking area may be determined on the basis of the calculated reliability and occupancy.

Reliability of a parking area may be determined on the basis of the difference value between the template and edge pixel (explained with to (a) and (b) of FIG. 6) corresponding to the second directional parking lines constituting the parking area. In detail, reliability of a parking area may be an average value of reliability of two second directional parking lines constituting the parking area. Reliability of each of the two directional parking lines may be determined on the basis of a difference value of the linear lines constituting the second directional parking line. When the second directional parking line is detected as a single linear line, a difference value of the linear line may be normalized to have a value between 0 and 1 so as to be calculated as reliability of the second directional parking line. When the second directional parking line is detected as two linear lines, a smaller difference value among difference values of the two linear lines may be normalized to have a value between 0 and 1 so as to be calculated as reliability of the second directional parking line.

Occupancy of a parking area may be determined by using position information of an object around the vehicle obtained by the ultrasonic sensor. This will be described with reference to FIG. 8.

Figure 8:
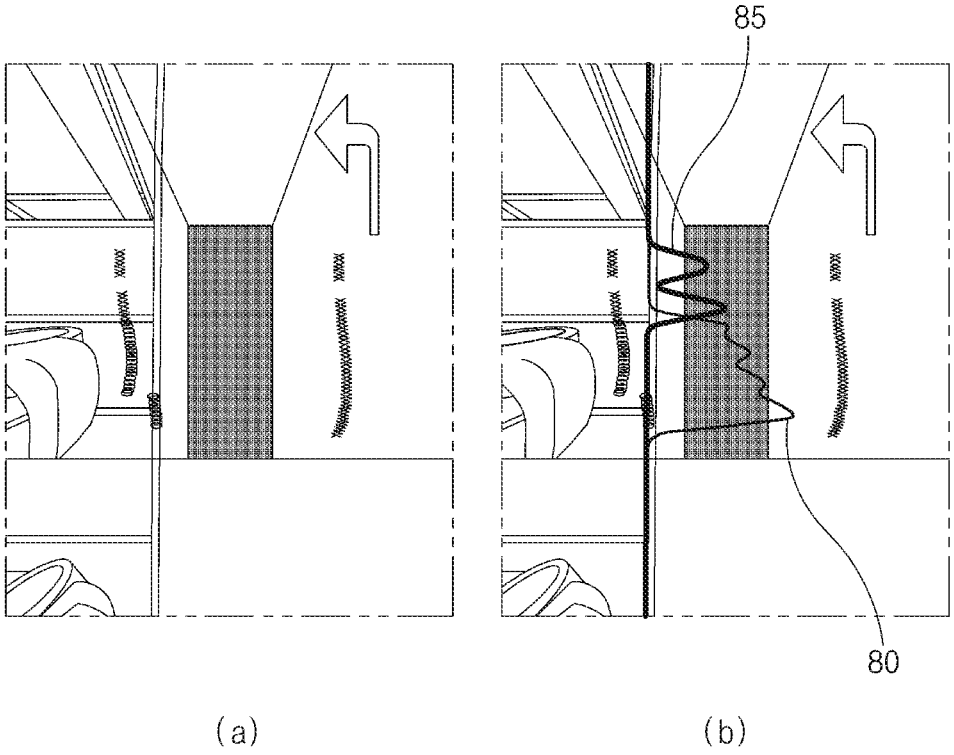
FIG. 8 is a view illustrating ultrasonic location information indicated in a top-view image according to an exemplary embodiment of the present inventive concept.

FIG. 8 is a view illustrating ultrasonic location information indicated in a top-view image according to an exemplary embodiment of the present inventive concept.

The parking area detecting apparatus 100 may predict a current location in consideration of a movement of the vehicle on the basis of ultrasonic information of an object around the vehicle detected from within a previous top view image. A movement direction and a distance of a vehicle may be predicted by using information obtained by a steering angle sensor and a wheel speed sensor, and a position of ultrasonic information obtained previously may be predicted in the current top view image by using the movement direction and distance of the vehicle.

Referring to (a) of FIG. 8, results of displaying a plurality of ultrasonic position information obtained previously in a current top view image in consideration of the movement of the vehicle are shown. Information (positive output) displayed by the mark "O" included in the ultrasonic information, as shown in FIG. 8(a) indicates a position of an object existing within a distance measurable by the ultrasonic sensor. On the other hand, information (negative output) displayed by the mark "X" indicates a case in which no object exists within the distance measurable by the ultrasonic sensor. The ultrasonic information displayed in FIG. 8(a) is displayed as discontinuous dots, so it may be changed into a continuous form. In FIG. 8, (b) shows the results of changing the ultrasonic information displayed in (a) of FIG. 8 into a continuous form. In FIG. 8(b), the positive output 80 and the negative output 85 were changed into a continuous form, respectively, by using a kernel density estimator. When the continuous ultrasonic information is obtained, a proportion of ultrasonic information of the positive output 80 to the entire ultrasonic information may be calculated and obtained as occupancy by parking areas. Occupancy represents a probability, so it may have a value between 0 and 1.

When reliability and occupancy of each parking area are calculated, a parking area may be finally determined on the basis of the reliability and occupancy. In detail, a weight may be given to the reliability and occupancy (for example, 0.3 may be given as a weight to the reliability and 0.7 may be given as a weight to the occupancy) and the weighted reliability and weighted occupancy may be added as a sum. When the sum is equal to or smaller than a pre-set value, a corresponding area may be determined as a parking area, and when the sum exceeds the pre-set value, a corresponding area may not be selected as a parking area. The weight given to reliability and occupancy may be changed according to the surroundings of the vehicle. For example, when a parking line is clearly indicated within the top view image or when an obstacle such as a column, or the like, does not exist, a weight given to reliability may be set to be higher than a weight given to occupancy, and the sum of weights may be 1.

When a parking area is detected from within the top view image, it is determined whether a parking area, which was detected previously, exists (S205). In detail, when a parking area registered to the parking area list exists, it may be determined that a parking area, which was detected previously, exists, and when a parking area registered to the parking area list does not exist, it may be determined that a parking area detected previously does not exist.

When a parking area detected previously does not exist (S205—N), the detected parking area may be registered to the parking area list (S210). When a parking area detected previously exists (S205—Y), a current location of the parking area detected previously may be predicted (S206). This will be described in detail with reference to FIG. 9.

Figure 9:
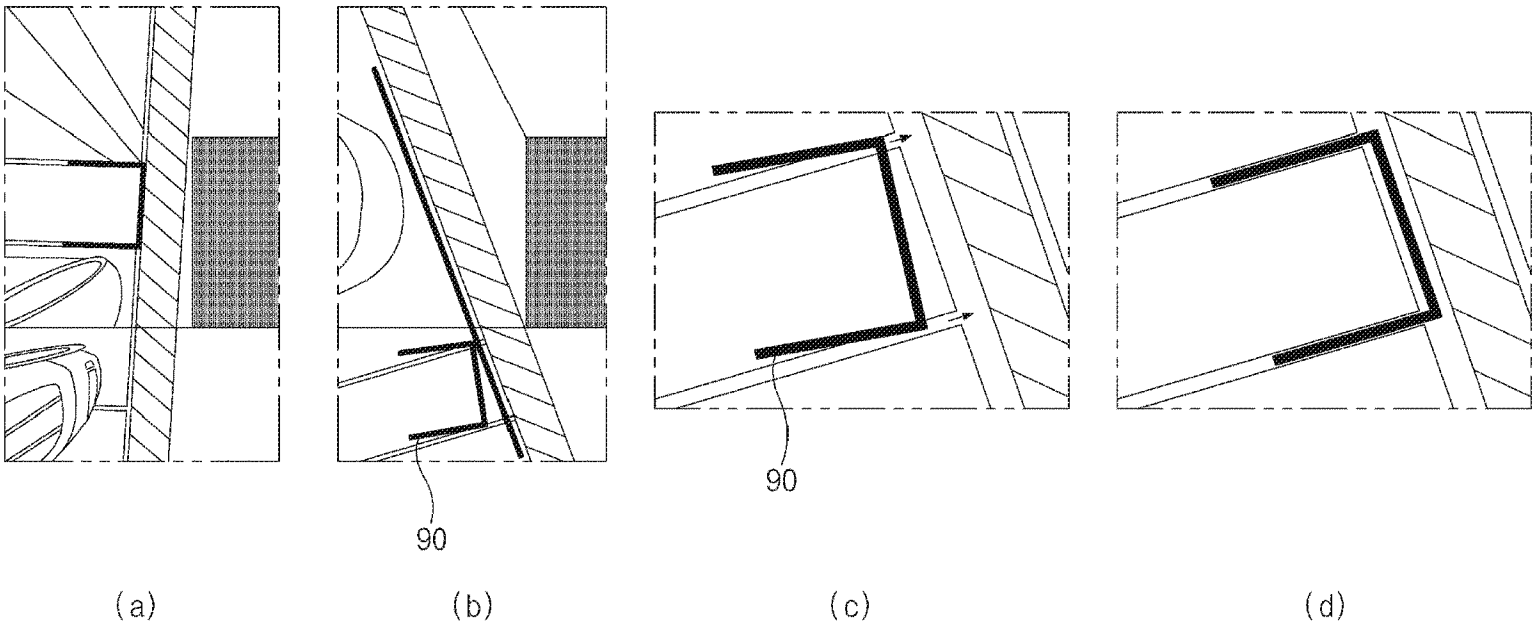
FIG. 9 is a view illustrating a process for predicting a location of a parking area according to an exemplary embodiment of the present inventive concept.

FIG. 9 is a view illustrating a process for predicting a location of a parking area according to an exemplary embodiment of the present inventive concept.

FIG. 9(a) shows a parking area detected from a previously detected top view image. A current location of the parking area detected previously and may be predicted in the same manner as that of ultrasonic information. Namely, a movement direction and distance of a vehicle may be predicted by using information obtained by a steering angle sensor and a wheel speed sensor, and a position of the parking area detected previously may be predicted in the current top view image by using a movement direction and a distance of the vehicle. FIG. 9(b) shows a previously detected parking area 90 predicted in consideration of a movement direction of a vehicle. However, there may be a difference between the predicted parking area 90 and an actual parking area as illustrated in FIG. 9(b). When the predicted parking area 90 has an error, a position of the predicted parking area 90 may be corrected. As illustrated in FIG. 9(c), a first directional parking line of the predicted parking area 90 may be projected to a first directional parking line detected from the current top view image, and a second directional parking line may be corrected to be perpendicular with respect to the first directional parking line detected from the current top view image. FIG. 9(d) shows the results of correcting the position of the predicted parking area 90.

Thereafter, when a current position of the parking area detected previously is predicted, the currently detected parking area may be compared with the predicted parking area (S207) and it is determined whether an overlapping region is equal to or greater than a pre-set proportion (S208). In comparing the parking areas, a square area having a width of the first directional parking line of the parking area as a length of one side may be set and a proportion of an overlapping area may be determined. In this case, the proportion of an overlapping area may be measured by using Jaccard coefficient signifying a ratio between an intersection and a union of the square area. When the two parking areas are completely identical, Jaccard coefficient is 1, and when the two parking areas do not overlap with each other completely, Jaccard coefficient is 0.

When an overlapping area according to the determination results is less than a pre-set proportion (e.g., 50%) (S208—N), a parking area detected from within the current top view image may be registered as a new parking area (S210). When the overlapping area is equal to or more than the pre-set proportion (S208—Y), it may be determined that a parking area detected previously is repeatedly detected, and one of the currently detected parking area and the parking area detected previously may be selected (S209). In this case, a parking area in which a value obtained by adding reliability and occupancy is smaller is selected. The selected parking area may be registered to the parking area list (S210) and the number of repetition detection may be updated. When the parking area is registered to the parking area list, corresponding reliability and occupancy of the parking area may also be registered together, and when the same parking area is repeatedly detected, the repetition number of detections may also be registered together.

Meanwhile, in operations S208 and S210, whether a parking area is new may be determined according to whether a proportion of an overlapping area is equal to or more than the pre-set value or less than the pre-set value, but according to an exemplary embodiment, a proportion of an overlapping area may be divided into three sections and whether to register a parking area may be determined. Namely, a proportion of the overlapping area may be divided into a section in which it is less than T1 (e.g., 20%), a section in which it is more than T2 (e.g., 80%), and a section in which it is between T1 and T2.

In detail, when a proportion of an overlapping area is less than T1, a currently detected parking area may be determined as a new parking area and registered to the parking area list. When a proportion of an overlapping area is more than T2, a currently detected parking area may be determined as a parking area identical to a parking area detected previously and a parking area in which a value obtained by adding reliability and occupancy is smaller may be selected and a repetition number of detections may be updated. When a proportion of an overlapping area is between T1 and T2, it may be determined that a parking area different due to an error is detected in an overlapping manner, and a parking area in which a value obtained by adding reliability and occupancy is smaller and a repetition number of detections is larger may be selected preferentially. However, since the same parking area is not repeatedly detected, a repetition number of detections may not updated.

Meanwhile, when a parking area is not detected from within a current top view image, the parking area detecting apparatus 100 may predict a current location according to a movement of the vehicle with respect to a parking area detected previously and display the predicted parking area in the current top view image in a manner similar to the process as described above with reference to FIG. 9.

Figure 10:
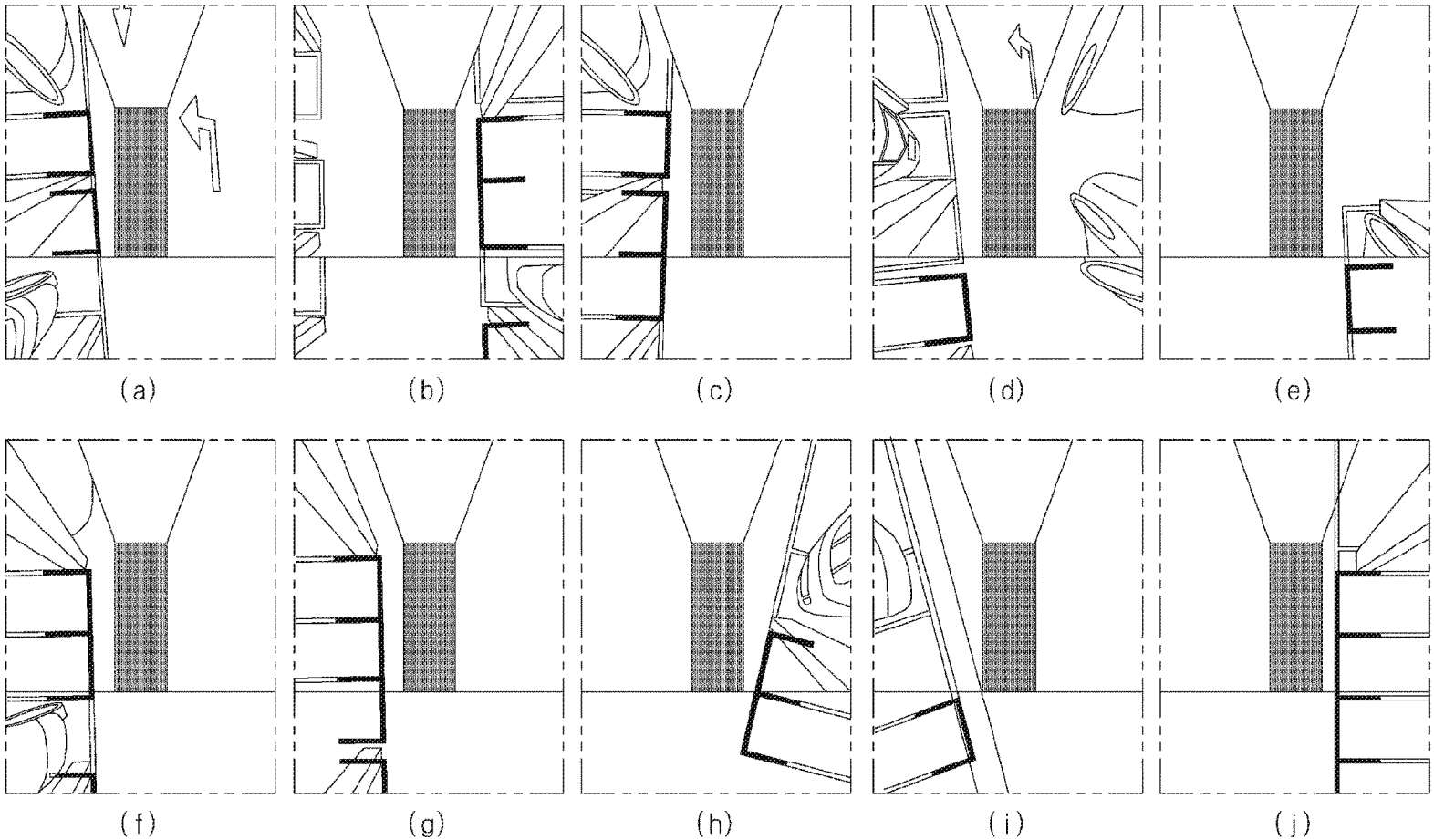
FIG. 10 is a view illustrating results of detecting a parking area according to an exemplary embodiment of the present inventive concept.

FIG. 10 is a view illustrating results of detecting a parking area according to an exemplary embodiment of the present inventive concept.

Referring to (a) through (j) of FIG. 10, it can be seen that a parking area is precisely detected in various situations. Also, it can be seen that, even when a parking area is partially covered by a column, the parking area may be detected, and a parking area in which parking is not available because a different vehicle is parked therein is not detected.

According to the parking area detecting method as described above, parking areas positioned around a vehicle may be accurately detected, and by registering the detected parking areas and continuously managing them, even when a parking area is covered with an obstacle such as a column, or the like, in a current image, the parking area can be displayed.

Meanwhile, when parking areas are detected, a template may be set in at least one of the detected parking areas and the parking area may be tracked. This will be described with reference to FIGS. 11 and 12.

Figure 11:
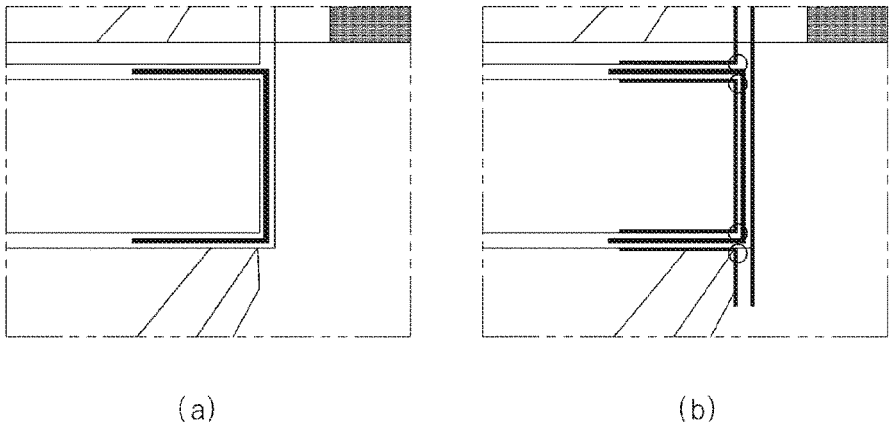
FIG. 11 is a view illustrating a process of setting a template according to an exemplary embodiment of the present inventive concept.

FIG. 11 is a view illustrating a process of setting a template according to an exemplary embodiment of the present inventive concept. FIG. 11(a) shows results of detecting a parking area from a top view image, and FIG. 11(b) shows results of setting a template having a "ㅠ" shape similar to that of the detected parking area in the detected parking area. The shape of the template may be set to "ㄷ" or "ㅠ" similar to that of a parking line constituting the parking area. Here, a thickness of the parking line may not be determined until before the parking area is detected, so it may be estimated from parking lines detected from the top view image and, in this case, a thickness of the template may be estimated by using a median operator.

Figure 12:
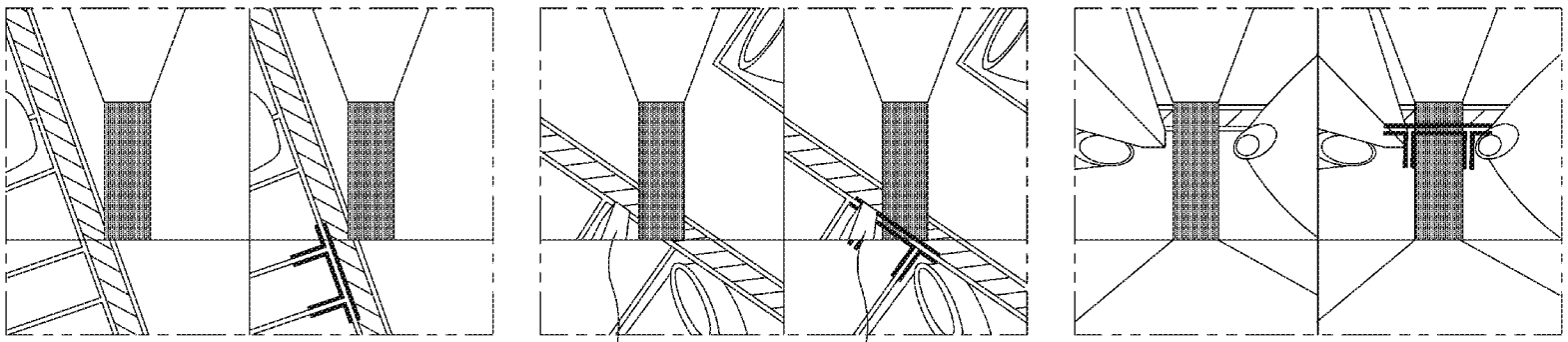
FIG. 12 is a view illustrating results of tracking a parking area using a template according to an exemplary embodiment of the present inventive concept.

FIG. 12 is a view illustrating results of tracking a parking area using a template according to an exemplary embodiment of the present inventive concept.

In FIG. 12, (a) through (c) show results of continuously tracking a parking area in a process of parking after the template having the "ㅠ" shape is set in the detected parking area. Referring to FIG. 12(b), it can be seen that, even though the second directional parking line is covered by a column 95 existing on the left side of a vehicle, a parking area can be effectively tracked.

The parking area detecting method according to exemplary embodiments of the present inventive concept may be implemented as a program executable in a terminal device having a processor, e.g., a microprocessor. Such a program may be stored in various types of recording medium so as to be used.

In detail, codes for performing the foregoing methods may be stored in various types of non-volatile recording medium such as a flash memory, a read only memory (ROM), an erasable programmable ROM (EPROM), an electronically erasable and programmable ROM (EEPROM), a hard disk, a removable disk, a memory card, a USB memory, a CD-ROM, and the like.

According to the exemplary embodiment of the present inventive concept, parking areas positioned near a vehicle may be accurately detected, and by registering the detected parking areas and continuously managing them, even when a parking area is partially covered or is not detected due to an obstacle such as a column, or the like, in a current image, the parking area may be displayed.

It should be interpreted that the scope of the present inventive concept is defined by the following claims rather than the above-mentioned detailed description and all modifications or alterations deduced from the meaning, the scope, and equivalences of the claims are included in the scope of the present invention.

What is claimed is:

1. A parking area detecting method, comprising:

generating a top view image by capturing images of surroundings of a vehicle;

detecting a first directional parking line from the top view image;

detecting at least one second directional parking line having a direction different from that of the first directional parking line from the top view image; and detecting a parking area by combining the first directional parking line and the second directional parking line;

wherein the detecting of the parking area includes:

detecting a square area defined by connecting the first directional parking line and the at least one second directional parking line; and determining the square area as the parking area,

*wherein a parking area previously detected exists, and*

*wherein the method further comprises:*

*comparing the parking area currently detected with the parking area detected previously;*

*determining a proportion of an overlapping area between the parking area currently detected and the parking area previously detected; and*

*registering the parking area currently detected as a new parking area if the overlapping proportion is equal to or less than a pre-set proportion.*

2. The method according to claim 1, wherein the detecting of the first directional parking line includes:

detecting edge pixels included in the top view image;

detecting two parallel linear lines minimizing a least square error from the top view image by using the detected edge pixels; and setting an area between the two parallel linear lines as the first directional parking line.

3. The method according to claim 2, wherein, in the detecting of the edge pixels, edge pixels having a direction within a preset angle on the basis of a movement direction of the vehicle, among edge pixels included in the top view image, are detected.

4. The method according to claim 2, wherein, in the detecting of the edge pixels, edge pixels existing within a pre-set distance from the vehicle, among the edge pixels, are detected.

5. The method according to claim 1, further comprising:

generating a template in at least one of *the* detected parking [areas] *area* and [tracking] a *tracked* parking area.

6. A parking area detecting method, comprising:

generating a top view image by capturing images of surroundings of a vehicle;

detecting a first directional parking line from the top view image;

detecting a second directional parking line having a direction different from that of the first directional parking line from the top view image; and detecting a parking area by combining the first directional parking line and the second directional parking line, wherein the detecting of the second directional parking line includes:

detecting edge pixels at a pre-set angle with respect to the first directional parking line among the edge pixels included in the top view image;

measuring differences between a linear template and the edge pixels by positions of the first directional parking line by using the linear template; and determining positions of local minimum points of the differences, as positions of the second directional parking line,

*wherein a parking area previously detected exists, and*

*wherein the method further comprises:*

*comparing the parking area currently detected with the parking area detected previously;*

*determining a proportion of an overlapping area between the parking area currently detected and the parking area previously detected; and*

*registering the parking area currently detected as a new parking area if the overlapping proportion is equal to or less than a pre-set proportion.*

7. The method according to claim 6, wherein, in the detecting of the edge pixels, edge pixels having pixel values decreased in the first direction and edge pixels having pixel values increased in the first direction are detected, respectively.

8. A parking area detecting method, comprising:

generating a top view image by capturing images of surroundings of a vehicle;

detecting a first directional parking line from the top view image;

detecting a second directional parking line having a direction different from that of the first directional parking line from the top view image;

detecting a parking area by combining the first directional parking line and the second directional parking line;

calculating reliability of a parking area on the basis of a difference of the second directional parking line constituting the parking area;

calculating occupancy of an interior of the parking area by using position information of an object around the vehicle obtained by an ultrasonic sensor; and determining a parking area on the basis of the reliability and occupancy, *wherein a parking area previously detected exists, and*

*wherein the method further comprises:*

*comparing the parking area currently detected with the parking area detected previously;*

*determining a proportion of an overlapping area between the parking area currently detected and the parking area previously detected; and*

*registering the parking area currently detected as a new parking area if the overlapping proportion is equal to or less than a pre-set proportion.*

9. A parking area detecting method, comprising:

generating a top view image by capturing images of surroundings of a vehicle;

detecting a first directional parking line from the top view images;

detecting a second directional parking line having a direction different from that of the first directional parking line from the top view image;

detecting [a] *an available* parking area by combining the first directional parking line and the second directional parking line;

[when a parking area detected previously exists,] predicting a current location according to a movement of the vehicle with respect to [the] *a* parking area detected previously;

comparing the *available* parking area with the parking area detected previously and determining a proportion of an overlapping area between the *available* parking area and the parking area detected previously; and

[when] *upon* the overlapping [area is] *proportion being* equal to or less than a pre-set proportion, registering the *available* parking [available] area as a new parking area, and [when] *upon* the overlapping [area exceeds] *proportion exceeding* the pre-set proportion, selecting one of the *available* parking [available] area and the parking area detected previously.

[10. The method according to claim 9, further comprising:

when a parking area is not detected from within the top view image, predicting a current location according to a movement of the vehicle with respect to the parking area detected previously; and displaying the predicted parking area within the top view image.]

*11. A parking area detecting method, comprising:*

*generating a view image by capturing images of surroundings of a vehicle;*

*detecting a first directional parking line from the view image;*

*detecting at least one second directional parking line having a direction different from that of the first directional parking line from the view image: and*

*detecting a parking area by combining the first directional parking line and the second directional parking line;*

*wherein the first directional parking line and the second directional parking line has a brighter color than a color of a bottom surface,*

*wherein the second directional parking line is perpendicular with respect to the first directional parking line,*

*wherein a parking area previously detected exists, and*

*wherein the method further comprises:*

*comparing the parking area currently detected with the parking area detected previously;*

*determining a proportion of an overlapping area between the parking area currently detected and the parking area previously detected; and*

*registering the parking area currently detected as a new parking area if the overlapping proportion is equal to or less than a pre-set proportion, and*

*wherein the detecting a parking area includes:*

*detecting a square area defined by connecting the first directional parking line and the at least one second directional parking line; and*

*determining the square area as the parking area.*

*12. The method according to claim 11, wherein the detecting the first directional parking line includes:*

*detecting edge pixels included in the view image;*

*detecting two parallel linear lines minimizing a least square error from the view image by using the detected edge pixels; and*

*setting an area between the two parallel linear lines as the first directional parking line.*

*13. The method according to claim 12, wherein, in the detecting edge pixels, edge pixels having a direction within a preset angle on the basis of a movement direction of the vehicle, among edge pixels included in the view image, are detected.*

*14. The method according to claim 12, wherein, in the detecting edge pixels, edge pixels existing within a pre-set distance from the vehicle, among the edge pixels, are detected.*

*15. The method according to claim 11, further comprising:*

*generating a template in at least one of the detected parking and a tracked parking area.*

*16. The method according to claim 11,*

*the method further comprises:*

*predicting a current location according to a movement of the vehicle with respect to the parking area detected previously.*

* * * * *